(12) United States Patent
Pelossof et al.

(10) Patent No.: US 8,909,572 B2
(45) Date of Patent: Dec. 9, 2014

(54) SYSTEMS, METHODS, AND MEDIA FOR PERFORMING CLASSIFICATION USING A BOOSTED CLASSIFIER

(75) Inventors: Raphael A. Pelossof, New York, NY (US); Michael Jones, Somerville, MA (US)

(73) Assignee: The Trustees of Columbia University in the City of New York, New York, NY (US)

( * ) Notice: Subject to any disclaimer, the term of this patent is extended or adjusted under 35 U.S.C. 154(b) by 526 days.

(21) Appl. No.: 12/819,166

(22) Filed: Jun. 18, 2010

(65) Prior Publication Data

US 2011/0093416 A1 Apr. 21, 2011

Related U.S. Application Data

(63) Continuation-in-part of application No. PCT/US2009/059592, filed on Oct. 5, 2009.

(60) Provisional application No. 61/218,296, filed on Jun. 18, 2009, provisional application No. 61/237,578, filed on Aug. 27, 2009, provisional application No. 61/356,549, filed on Jun. 18, 2010, provisional application No. 61/102,766, filed on Oct. 3, 2008.

(51) Int. Cl.
*G06F 15/18* (2006.01)
*G06N 99/00* (2010.01)

(52) U.S. Cl.
CPC .................................. *G06N 99/005* (2013.01)
USPC ......................................................... 706/20

(58) Field of Classification Search
USPC .................................................... 706/12, 20
See application file for complete search history.

(56) References Cited

U.S. PATENT DOCUMENTS

| | | | |
|---|---|---|---|
| 5,819,247 A * | 10/1998 | Freund et al. ................... | 706/25 |
| 6,456,991 B1 | 9/2002 | Srinivasa et al. | |
| 7,016,881 B2 | 3/2006 | Li et al. | |
| 7,050,607 B2 | 5/2006 | Li et al. | |
| 7,076,473 B2 | 7/2006 | Moghaddam | |
| 7,203,669 B2 | 4/2007 | Lienhart et al. | |
| 7,212,651 B2 | 5/2007 | Viola et al. | |

(Continued)

OTHER PUBLICATIONS

Bourdev, L. and Brandt, J., "Robust Object Detection via Soft Cascade", In IEEE Computer Society Conference on Computer Vision and Pattern Recognition (CVPR 2005), vol. 2, Jun. 20-25, 2005, pp. 236-243.

(Continued)

*Primary Examiner* — Alan Chen
(74) *Attorney, Agent, or Firm* — Byrne Poh LLP

(57) ABSTRACT

Systems, methods, and media that: implement a boosted classifier having a plurality of weak hypotheses that produce a classification, each of the plurality of weak hypotheses having at least one weight; receive testing data; receive at least one piece of training data subsequently to receiving the testing data; calculate corrective terms for correcting a sum of weights of correctly classified training data and a sum of weights of incorrectly classified training data; calculate the sum of weights of correctly classified training data and the sum of weights of incorrectly classified training data based on the corrective terms; modify the at least one weight of at least one of the plurality of weak hypotheses in response to the at least one piece of training data based on the sum of weights to produce modified weights; and classify the testing data based on the modified weights to produce a classification.

24 Claims, 1 Drawing Sheet

(56) References Cited

U.S. PATENT DOCUMENTS

| | | | |
|---|---|---|---|
| 7,421,415 | B2 | 9/2008 | Dong et al. |
| 7,526,101 | B2 | 4/2009 | Avidan |
| 7,529,403 | B2 | 5/2009 | Ivanov |
| 7,640,219 | B2 | 12/2009 | Perrizo |
| 7,668,346 | B2 | 2/2010 | Xiao et al. |
| 7,724,962 | B2 | 5/2010 | Zhu et al. |
| 7,835,541 | B2 | 11/2010 | Lee et al. |
| 7,844,108 | B2 * | 11/2010 | Sabe et al. ............ 382/159 |
| 8,275,721 | B2 * | 9/2012 | Abe et al. ............... 706/12 |
| 2006/0074834 | A1 * | 4/2006 | Dong et al. ............. 706/45 |
| 2008/0071711 | A1 | 3/2008 | Zhang et al. |

OTHER PUBLICATIONS

Bradley, J.K. and Schapire, R.E., "FilterBoost: Regression and Classification on Large Datasets", In Advances in Neural Information Processing Systems, vol. 20, 2007, pp. 185-192.

Cesa-Bianchi, N., et al., "Worst-Case Analysis of Selective Sampling for Linear Classification", In Journal of Machine Learning Research, vol. 7, Dec. 1, 2006, pp. 1205-1230.

Cohn, D., et al., "Improving Generalization with Active Learning", In Machine Learning, vol. 15, No. 2, 1994 pp. 201-221.

Crammer, K., et al., "Online Passive-Aggressive Algorithms", In The Journal of Machine Learning Research, vol. 7, Dec. 1, 2006, pp. 551-585.

Dasgupta, S., et al., "Analysis of Perceptron-Based Active Learning", In the Eighteenth Annual Conference on Learning Theory (COLT), 2005, pp. 249-263.

Fleming, T.R., et al., "Designs for Group Sequential Tests", In Controlled Clinical Trials vol. 5, No. 4, supp. 1, Dec. 1984, pp. 348-361.

Freund, Y. and Schapire, R.E., "A Decision-Theoretic Generalization of On-Line Learning and an Application to Boosting", In Journal of Computer and System Sciences, vol. 55, No. 1, 1997, pp. 119-139.

Freund, Y., "An Adaptive Version of the Boost by Majority Algorithm", In Machine Learning, vol. 43, No. 3, 2001, pp. 293-318.

Freund, Y., et al., "Selective Sampling Using the Query by Committee Algorithm", In Machine Learning, vol. 28, 1997, pp. 133-168.

Huang, C., et al., "Incremental Learning of Boosted Face Detector", In IEEE 11th International Conference on Computer Vision, (ICCV 2007), Oct. 14-21, 2007, pp. 1-8.

International Preliminary Report on Patentability in International Patent Application No. PCT/US2009/059592, filed Oct. 5, 2009, mailed Apr. 14, 2011.

International Search Report in International Patent Application No. PCT/US2009/059592, filed Oct. 5, 2009, mailed Nov. 13, 2009.

Javed, O., et al., "Online Detection and Classification of Moving Objects Using Progressively Improving Detectors", In IEEE Computer Society Conference on Computer Vision and Pattern Recognition (CVPR 2005), vol. 1, Jun. 20-25, 2005, pp. 696-701.

Jones, M.J. and Viola, P., "Face Recognition Using Boosted Local Features", In Mitsubishi Electric Research Laboratories (MERL) Technical Report TR2003-25, Apr. 2003.

Kivinen, J. and Warmuth, M.K., "Exponentiated Gradient Versus Gradient Descent for Linear Predictors", In Information and Computation, vol. 132, No. 1, Jan. 1997, pp. 1-63.

Lan, K.K.G. and DeMets, D.L., "Discrete Sequential Boundaries for Clinical Trials", In Biometrika, vol. 70, No. 3, Dec. 1983, pp. 659-663.

Lan, K.K.G., et al., "Stochastically Curtailed Tests in Long-Term Clinical Trials", In Sequential Analysis, vol. 1, No. 3, 1982, pp. 207-219.

Littlestone, N., "Learning Quickly When Irrelevant Attributes Abound: A New Linear-Threshold Algorithm", In Machine Learning, vol. 2, No. 4, 1998, pp. 285-318.

Long, P.M. and Servedio, R.A., "Adaptive Martingale Boosting", In 22nd Annual Conference in Neural Information Processing Systems (NIPS), 2008, pp. 977-984.

Long, P.M. and Servedio, R.A., "Martingale Boosting", In Proceedings of the 18th Annual Conference on Learning Theory (COLT'05), 2005, pp. 79-94.

Matas, J. and Sochman, J., "Wald's Sequential Analysis for Time-constrained Vision Problems", In Unifying Perspectives in Computational and Robot Vision, Lecture Notes in Electrical Engineering, Springer, vol. 8, 2007, pp. 57-77.

Mnih, V., et al., "Empirical Bernstein Stopping", In Proceedings of the 25th International Conference on Machine Learning (ICML '08), Helsinki, Finland, 2008, pp. 672-679.

Oza, N.C. and Russell, S., "Online Bagging and Boosting", In the Eighth International Workshop on Artificial Intelligence and Statistics, Jan. 2001, pp. 105-112.

Pelossof, R., et al., "Online Coordinate Boosting", In IEEE 12th International Conference on Computer Vision Workshops (ICCV Workshops), Sep. 27-Oct. 4, 2009, pp. 1354-1361.

Pham, M.T. and Cham, T.J., "Online Learning Asymmetric Boosted Classifiers for Object Detection", In IEEE Conference on Computer Vision and Pattern Recognition (CVPR '07), Jun. 17-22, 2007, pp. 1-8.

Pocock, S.J., "Group Sequential Methods in Design and Analysis of Clinical Trials", In Biometrika, vol. 64, No. 2, Aug. 1977, pp. 191-199.

Rosenblatt, F., "The Perception: A Probabilistic Model for Information Storage and Organization in the Brain", In Psychological Review, vol. 65, No. 6, 1958, pp. 386-408.

Schapire, R.E. and Singer, Y., "Improved Boosting Algorithms Using Confidence-Rated Predictions", In Machine Learning, vol. 37, No. 3, 1999, pp. 297-336.

Schapire, R.E., et al., "Boosting the Margin: A New Explanation for the Effectiveness of Voting Methods", In The Annals of Statistics, vol. 26, No. 5, May 7, 1998, pp. 1651-1686.

Settles, B., "Active Learning Literature Survey", In Computer Sciences Technical Report 1648, University of Wisconsin-Madison, Jan. 9, 2009, pp. 1-46.

Viola, P. and Jones, M., "Rapid Object Detection Using a Boosted Cascade of Simple Features", In Proceedings of the IEEE Conference on Computer Vision and Pattern Recognition (CVPR 2001), vol. 1, 2001.

Wald, A., "Sequential Tests of Statistical Hypotheses", In The Annals of Mathematical Statistics, vol. 16, No. 2, Jun. 1945, pp. 117-186.

Watanabe, O., "Simple Sampling Techniques for Discovery Science", In IEICE Transactions on Information and Systems, vol. E83-D, No. 1, Jan. 20, 2000, pp. 19-26.

Written Opinion in International Patent Application No. PCT/US2009/059592, filed Oct. 5, 2009, mailed Nov. 13, 2009.

Wu, B. and Nevatia, R., "Improving Part Based Object Detection by Unsupervised, Online Boosting", In IEEE Conference on Computer Vision and Pattern Recognition (CVPR '07), Jun. 17-22, 2007, pp. 1-8.

Xiao, R., et al., "Boosting Chain Learning for Object Detection", In Proceedings of the Ninth IEEE International Conference on Computer Vision Proceedings (ICCV 2003), Oct. 13-16, 2003, pp. 709-715.

Grabner, H. and Bischof, H., "On-line Boosting and Vision", In Proceedings of the IEEE Conference on Computer Vision and Pattern Recognition, Jun. 17-22, 2006, New York, NY, USA, vol. 1, pp. 260-267.

* cited by examiner

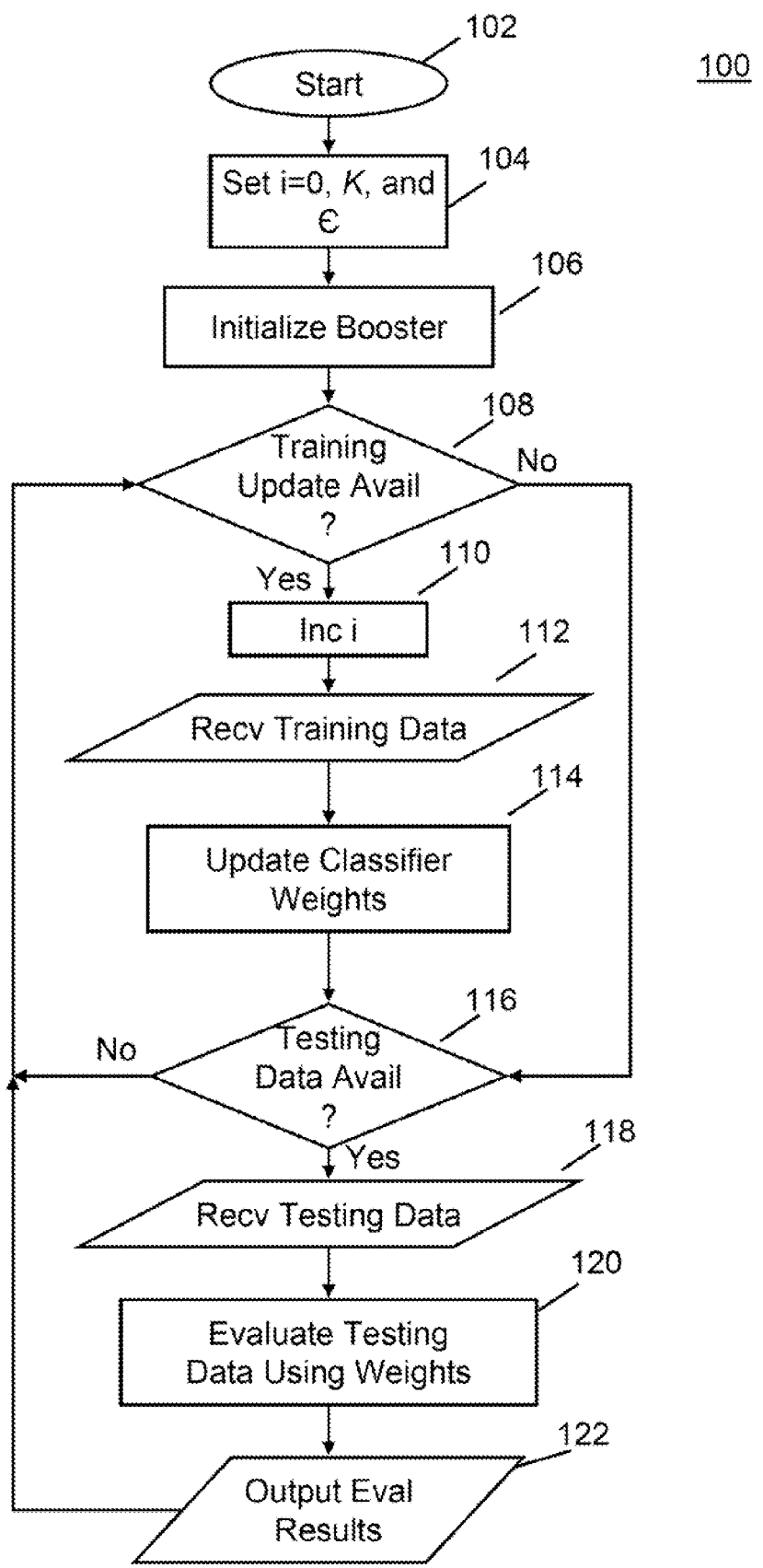

SYSTEMS, METHODS, AND MEDIA FOR PERFORMING CLASSIFICATION USING A BOOSTED CLASSIFIER

CROSS REFERENCE TO RELATED APPLICATIONS

This application is a continuation-in-part of International Application No. PCT/US09/59592 (which is hereby incorporated by reference herein in its entirety), filed Oct. 5, 2009, which claims the benefit of U.S. Provisional Patent Application No. 61/102,766 (which is hereby incorporated by reference herein in its entirety), filed Oct. 3, 2008, and this application claims the benefit of U.S. Provisional Patent Application Nos. 61/218,296, filed Jun. 18, 2009, 61/237,578, filed Aug. 27, 2009, 61/356,549, filed Jun. 18, 2010, each of which is hereby incorporated by reference herein in its entirety.

TECHNICAL FIELD

The disclosed subject matter relates to systems, methods, and media for performing classification.

BACKGROUND

Classification techniques are widely used for machine intelligence. Such techniques can be used for a wide variety of applications, such as, but not limited to, to perform image recognition, to control buying and selling of securities, to perform natural language processing, to perform medical detection functions (such as detecting cancer in an image), to perform stock market analysis (which can then be presented on a computer display, for example), to perform weather prediction, to perform analysis of motion in video images (which can then be used to generate new video (for display on a display, for example), to alert a user (e.g., in a security application), etc.), to provide bio sensors, to control systems (such as the motion of robots, the operation of HVAC systems, the operation of cruise control systems, the operation of navigation systems, etc.), etc.

Techniques for boosting the performance of classifiers are known. For example, the Adaboost technique can be used to boost the performance of weak classifiers making up a classifier by repeatedly training the classifier to provide updates to the classifier weights corresponding to the weak classifiers. Adaboost is described in Robert E. Schapire et al., "Boosting the Margin: a New Explanation for the Effectiveness of Voting Methods," Annals of Statistics, 26(5):1651-1686, 1998, which is hereby incorporated by reference herein in its entirety.

In many instances, classifiers need to be updated when online—for example, when being used to perform classification. This the case, for example, because many classifiers are designed for general applications but only used in particular applications, where a more application-specific training would produce improved results. However, known techniques for boosting classifiers are inadequate.

SUMMARY

Systems, methods, and media for performing classification are provided. In some embodiments, systems for performing classification are providing, the systems comprising: a processor that: implements a boosted classifier having a plurality of weak hypotheses that produce a classification, each of the plurality of weak hypotheses having at least one weight; receives testing data; receives at least one piece of training data subsequently to receiving the testing data; calculates corrective terms for correcting a sum of weights of correctly classified training data and a sum of weights of incorrectly classified training data; calculates the sum of weights of correctly classified training data and the sum of weights of incorrectly classified training data based on the corrective terms; modifies the at least one weight of at least one of the plurality of weak hypotheses in response to the at least one piece of training data based on the sum of weights to produce modified weights; and classifies the testing data based on the modified weights to produce a classification; and an output device that indicates the classification of the testing data.

In some embodiments, methods for performing classification are provided, the methods comprising: implementing a boosted classifier having a plurality of weak hypotheses that produce a classification, each of the plurality of weak hypotheses having at least one weight; receiving testing data; receiving at least one piece of training data subsequently to receiving the testing data; calculating corrective terms for correcting a sum of weights of correctly classified training data and a sum of weights of incorrectly classified training data; calculating the sum of weights of correctly classified training data and the sum of weights of incorrectly classified training data based on the corrective terms; modifying the at least one weight of at least one of the plurality of weak hypotheses in response to the at least one piece of training data based on the sum of weights to produce modified weights; classifying the testing data based on the modified weights to produce a classification; and indicating the classification of the testing data.

In accordance with some embodiments, computer-readable media encoded with computer executable instructions that when executed by a processor cause the processor to perform a method for performing classification, the method comprising: implementing a boosted classifier having a plurality of weak hypotheses that produce a classification, each of the plurality of weak hypotheses having at least one weight; receiving testing data; receiving at least one piece of training data subsequently to receiving the testing data; calculating corrective terms for correcting a sum of weights of correctly classified training data and a sum of weights of incorrectly classified training data; calculating the sum of weights of correctly classified training data and the sum of weights of incorrectly classified training data based on the corrective terms; modifying the at least one weight of at least one of the plurality of weak hypotheses in response to the at least one piece of training data based on the sum of weights to produce modified weights; classifying the testing data based on the modified weights to produce a classification; and indicating the classification of the testing data.

BRIEF DESCRIPTION OF THE DRAWINGS

FIG. 1 is a diagram of a process for updating a classifier and performing classification in accordance with some embodiments.

DETAILED DESCRIPTION

Systems, methods, and media for performing classification are provided. In some embodiments, classification techniques can be implemented as described herein. These classification techniques can receive one or more suitable inputs and generate one or more suitable outputs. The inputs can be any suitable testing data and training data. The outputs can be indications of how the testing data is classified based on the training data. For example, in some applications, a voice recognition mechanism can use a classifier to determine whether a word spoken by a user corresponds to a given word (e.g., "YES"). Training data of a user or other users speaking the given word can be used to train a classifier. A signal corresponding to the spoken word can subsequently be received as testing data. A trained classifier can then be used to determine whether the spoken word corresponds to the given word. If there is a match, an output indicating the match can be generated.

As described above, a classifier can include one or more weak classifiers. For example, a classifier H(x) can be defined as:

$$H(x) = \text{sign}\left(\sum_{j=1}^{J} \alpha_j h_j(x)\right).$$

In this definition:

$$h_j(x) \in \{-1, 1\},$$

where $h_j(x)$ are the weak classifiers for input x that produce −1 if there is no match between the input x and the classification (e.g., corresponding to the word "YES" in the example above) for the classifier, and +1 if there is a match. Also, in this definition:

$$\alpha_j \in \mathcal{R}$$

where $\alpha_j$ are weights for the weak classifiers and $\mathcal{R}$ is the set of real numbers.

In some embodiments, the performance of such a classifier H(x) can be improved by "boosting." For example, in some embodiments, boosting techniques can be used to adjust the weights $\alpha_j$ used in the classifier. Moreover, as described further below, some of these boosting techniques can be operated while the classifier is online—e.g., being used to classify testing data.

In some embodiments, classifiers and boosting techniques used in connection with them as described herein, can be used for any suitable application. For example, such techniques can be used to perform machine intelligence, to perform image recognition, to control buying and selling of securities, to perform natural language processing, to perform medical detection functions (such as detecting cancer in an image), to perform stock market analysis (which can then be presented on a computer display, for example), to perform weather prediction, to perform analysis of motion in video images (which can then be used to generate new video (for display on a display, for example), to alert a user (e.g., in a security application), etc.), to provide bio sensors, to control systems (such as the motion of robots, the operation of HVAC systems, the operation of cruise control systems, the operation of navigation systems, etc.), etc.

Turning to FIG. 1, an example 100 of a process for boosting a classifier and using the classifier to test data in accordance with some embodiments is illustrated. As shown, after process 100 begins at 102, the process can set an index variable i to zero. This index variable can be used to track the number of updates to the classifier (or the number of times the classifier is boosted). Also at 102, an order parameter (K) and a smoothing parameter ($\epsilon$) can be set. The order parameter K sets a tradeoff between accuracy and speed. Larger values for K increase the accuracy of the algorithm, but are more costly to compute. Any suitable order parameter and smoothing parameter can be used.

Next, at 106, a booster process (described below) can be initialized. Any suitable approach to initializing the booster process can be used in some embodiments. For example, in some embodiments, initialization can include initializing: weights for weak classifiers ($\alpha_j$) to zero; the change in weights for classifiers ($\Delta \alpha_j$) to zero; and the sums of correctly and incorrectly classified examples by weak hypothesis j ($W_{jk}^+$, $W_{jk}^-$) to a smoothing parameter ($\epsilon$), where j=0 . . . J, k=0 . . . J, and J is the number of weak classifiers in the classifier H. As another example, in some embodiments, Ada-Boost can be run on a small set of training examples to initialize these parameters.

At 108, process 100 can then determine if any training data updates are available. These updates can be used to train the classifier while the classifier is online—for example, while the classifier is being used to evaluate testing data. If it is determined that a training update is available, then, at 110, the index i can be updated and, at 112, the updated training data can be received. This data can be received from any suitable source such as an operator manually classifying the training data, from a secondary system that classifies the training data, etc. In some embodiments, the training data can include training example margins $m_{ij}$, where $m_{ij}$ equals 1 for correctly classified examples and −1 for incorrectly classified examples.

Next, at 114, the received training data can be used to boost the classifier using any suitable approach. For example, using a first mechanism, the received training data can be used to boost the classifier as follows:

$$d = 1$$

for $j = 1$ to $J$ do $$j_0 = \max(0, j - K)$$

$$\pi_j^+ = \prod_{k=j_0}^{j-1}\left(\frac{W_{jk}^+}{W_{jj}^+}e^{-\Delta\alpha_k} + \left(1 - \frac{W_{jk}^+}{W_{jj}^+}\right)e^{\Delta\alpha_k}\right)$$

$$\pi_j^- = \prod_{k=j_0}^{j-1}\left(\frac{W_{jk}^-}{W_{jj}^-}e^{-\Delta\alpha_k} + \left(1 - \frac{W_{jk}^-}{W_{jj}^-}\right)e^{\Delta\alpha_k}\right)$$

for $k = 1$ to $j$ do $$W_{jk}^+ \leftarrow W_{jk}^+ \pi_j^+ + d1_{[m_{ik}=+1]} \cdot 1_{[m_{ij}=+1]}$$

$$W_{jk}^- \leftarrow W_{jk}^- \pi_j^- + d1_{[m_{ik}=-1]} \cdot 1_{[m_{ij}=-1]}$$

end for $$\alpha_j^i = \frac{1}{2}\log\frac{W_{jj}^+}{W_{jj}^-}$$

$$\Delta\alpha_j = \alpha_j^i - \alpha_j^{i-1}$$

$$d \leftarrow de^{-\alpha_j^i m_{ij}}$$

end for where:
J is the number of weak classifiers;
K is an order parameter;
$\pi_j^+, \pi_j^-$ are corrective terms that correct sums of weights of correctly classified examples and incorrectly classified examples to better approximate the sum of weights that would be calculated in a batch Adaboost process;
$\alpha_j$ are weights for the weak classifiers;
$\Delta\alpha_j$ are the change in weights for the weak classifiers;

$m_{ij}$, $m_{ik}$ are the margins for the weak classifiers against training data i, and equal 1 for correctly classified data and −1 for incorrectly classified training data—for example, $m_{ij}$ can be set equal to $y_i * h_j(x_i)$, where $y_i$ is a value that represents the correct classification of training example i as +1 when it matches the classifier's classification and −1 when the it does not match the classifier's classification, and $h_j(x_i)$ is a value that represents the classification of training example i by weak classifier j as +1 when it matches the classifier's classification and −1 when the it does not match the classifier's classification;

$1_{[]}$ is an indicator function that indicates if an ith example was correctly classified or incorrectly classified by the jth hypothesis; and $W_{jk}^{+30}$, $W_{jk}^-$ are the sums of correctly and incorrectly classified training data examples by weak hypothesis j.

As another example, using a second mechanism, the received training data can be used to boost the classifier at 114 as follows:

$$d = 1$$
$$\rho_0 = 0$$
$$\text{for } j = 1 \text{ to } J \text{ do}$$
$$\quad \rho_j = \rho_{j-1} + \alpha_j m_{ij} / \sqrt{z_i}$$
$$\quad \tilde{\rho}_{1j} = \exp\{-0.5 \max(\theta - \rho_j, 0)^2\}$$
$$\quad \text{If } \frac{\tilde{\rho}_{1j}}{1 - \tilde{\rho}_{1j}} \leq \frac{\beta}{1 - \alpha} \text{ then}$$
$$\quad\quad \text{Continue [exit out for "for } j = \ldots \text{" loop]}$$
$$\quad j_0 = \max(0, j - K)$$
$$\quad \pi_j^+ = \prod_{k=j_0}^{j-1} \left(\frac{W_{jk}^+}{W_{jj}^+} e^{-\Delta\alpha_k} + \left(1 - \frac{W_{jk}^+}{W_{jj}^+}\right) e^{\Delta\alpha_k}\right)$$
$$\quad \pi_j^- = \prod_{k=j_0}^{j-1} \left(\frac{W_{jk}^-}{W_{jj}^-} e^{-\Delta\alpha_k} + \left(1 - \frac{W_{jk}^-}{W_{jj}^-}\right) e^{\Delta\alpha_k}\right)$$
$$\quad \text{for } k = 1 \text{ to } j \text{ do}$$
$$\quad\quad W_{jk}^+ \leftarrow W_{jk}^+ \pi_j^+ + d 1_{[m_{ik}=+1]} \cdot 1_{[m_{ij}=+1]}$$
$$\quad\quad W_{jk}^- \leftarrow W_{jk}^- \pi_j^- + d 1_{[m_{ik}=-1]} \cdot 1_{[m_{ij}=-1]}$$
$$\quad \text{end for}$$
$$\quad \alpha_j^i = \frac{1}{2} \log \frac{W_{jj}^+}{W_{jj}^-}$$
$$\quad \Delta\alpha_j = \alpha_j^i - \alpha_j^{i-1}$$
$$\quad d \leftarrow d e^{-\alpha_j^i m_{ij}}$$
$$\text{end for}$$
$$\text{Update } z_i = \sum_{k=1}^{n} \alpha_k^2 \text{ by updating coordinates } 1\ldots j$$

where:
variables in common with the first mechanism are similarly defined;
$z_1$ is initialized to 1;
$\rho_j$ is the margin of an example for a feature j;
$\theta$ is a threshold and can be set equal to 0 (or any other suitable value or values (e.g., a different value within a range for each classifier));
$\alpha = 0.95$ (or any other suitable value); and
$\beta = 0.8$ (or any other suitable value).

As can be seen in the first four lines of the "for j=" loop of this second mechanism, the computation of feature evaluations can be stopped early by exiting out of the "for j=" loop via the continue instruction when uninformative examples are received. The determination of whether to stop processing on an example (a piece of training data) can be made based on any suitable criteria or criterion, such as the cumulative margin of the example at a feature j. In this way, the boosting process can be made faster.

As yet another example, using a third mechanism, the received training data can be used to boost the classifier at 114 as follows:

$$d = 1$$
$$S_0 = 0$$
$$\text{for } j = 1 \text{ to } J \text{ do}$$
$$\quad j_0 = \max(0, j - K)$$
$$\quad S_j = S_{j-1} + y_i \alpha_j h_j(x_i)$$
$$\quad \pi_j^+ = \prod_{k=j_0}^{j-1} \left(\frac{W_{jk}^+}{W_{jj}^+} e^{-\Delta\alpha_k} + \left(1 - \frac{W_{jk}^+}{W_{jj}^+}\right) e^{\Delta\alpha_k}\right)$$
$$\quad \pi_j^- = \prod_{k=j_0}^{j-1} \left(\frac{W_{jk}^-}{W_{jj}^-} e^{-\Delta\alpha_k} + \left(1 - \frac{W_{jk}^-}{W_{jj}^-}\right) e^{\Delta\alpha_k}\right)$$
$$\quad \text{for } k = 1 \text{ to } j \text{ do}$$
$$\quad\quad W_{jk}^+ \leftarrow W_{jk}^+ \pi_j^+ + d 1_{[m_{ik}=+1]} \cdot 1_{[m_{ij}=+1]}$$
$$\quad\quad W_{jk}^- \leftarrow W_{jk}^- \pi_j^- + d 1_{[m_{ik}=-1]} \cdot 1_{[m_{ij}=-1]}$$
$$\quad \text{end for}$$
$$\quad \alpha_j^i = \frac{1}{2} \log \frac{W_{jj}^+}{W_{jj}^-}$$
$$\quad \Delta\alpha_j = \alpha_j^i - \alpha_j^{i-1}$$
$$\quad d \leftarrow d e^{-\alpha_j^i m_{ij}}$$
$$\quad \text{If } S_j > \theta + \|\alpha_{j,J}\| \sqrt{\ln \frac{1}{\delta^2}} \text{ then}$$
$$\quad\quad \text{Continue [exit out for "for } j = \ldots \text{" loop]}$$
$$\text{end for}$$

where:
variables in common with the first and/or second mechanism are similarly defined;
$S_j$ is the margin of an example for a feature j;
$\alpha_{j,J}$ is the norm of the remaining weights, which can be calculated in any suitable fashion, such as by initializing $\|\alpha_{1,n}\|^2 = \|\alpha\|^2 - \alpha_1^2$ and updating the norms of the remaining weights $\|\alpha_{i,n}\|$ (where i=1 … n−1) every time a feature is updated with $\|\alpha_{i+1,n}\|^2 = \|\alpha_{i,n}\|^2 - \alpha_{i+1}^2$;
$\theta$ is a threshold and can be set equal to 0 (or any other suitable value or values (e.g., a different value within a range for each classifier));
$\delta = 0.8$ (or any other suitable value, such as 0.1).

Like in the second mechanism, as can be seen in the lines referencing the variable "S" of this third mechanism, the computation of feature evaluations can be stopped early by exiting out of the "for j=" loop via the continue instruction when uninformative examples are received. The determination of whether to stop processing on an example (a piece of training data) can be made based on any suitable criteria or criterion, such as the cumulative margin of the example at a feature j. In this way, the boosting process can be made faster.

After the classifier weights have been updated at 114, or after it is determined at 108 that a training update is not available, then, at 116, process 100 can determine if any testing data is available. This testing data can be received from any suitable source. If testing data is determined to be available, then process 100 can receive the testing data at 118 using any suitable mechanism. For example, this testing data can be received over any suitable interface.

Next, at 120, the testing data can be evaluated using a classifier using the classifier weights. For example, as set forth above, the classifier can be defined as follows:

$$H(x) = \text{sign}\left(\sum_{j=1}^{J} a_j h_j(x)\right)$$

where:
J is the number of weak classifiers making up the classifier;
$a_j \in \mathcal{R}$ are the weights;
$h_j(x) \in \{-1, 1\}$ are the weak classifiers; and
H(x) returns +1 if the testing data matches the classification corresponding to the classifier and −1 the testing data does not match that classification.

Any suitable weak classifiers can be used to make up the classifier in some embodiments.

Finally, at 122, the results of the evaluation can be output. These results can be output to any suitable device and be used for any suitable purpose. Once the results are output, process 100 can loop back to 108 to check for additional training updates.

In some embodiments, process 100 can additionally include any suitable mechanism for performing feature selection. For example, feature selection as described in N. Oza et al., "Online Bagging and Boosting," In *Artificial Intelligence and Statistics*, pages 105-112, Morgan Kaufmann, 2001 and/or H. Grabner et al., "On-Line Boosting and Vision," In *Proceedings IEEE Conference on Computer Vision and Pattern Recognition (CVPR)*, volume 1, pages 260-267, 2006, each of which are hereby incorporated by reference herein in their entireties, can be used in some embodiments.

In accordance with some embodiments, classification techniques can be implemented in any suitable hardware and/or software capable of performing the functions described herein. For example, the classification techniques can be implemented in one or more processors using suitable software. More particularly, such processors can include any suitable computers, servers, microprocessors, controllers, digital signal processors, programmable logic devices, etc. The software for controlling such processors can be stored on any suitable computer readable media, such as disk drives, compact disks, digital video disks, memory (such as random access memory, read only memory, flash memory, etc.), and/or any other suitable media. The classification techniques can be coupled to output devices using any suitable interface. For example, the classification techniques can interface to display screens though a video interface, to network devices through a network interface, to electro-mechanical devices though a servo controller (or any other suitable controller), etc. Inputs to the classification techniques can be provided from any suitable input devices, such as a keyboard, a mouse, a stock market data feed, a video input device, a bio interface (such as a pulse monitor, blood pressure monitor, fingerprint reader, eye scanner, etc.), a motion sensor, a thermostat, a humidity detector, a solar detector, a speed detector, a direction detector, a location detector (such as global positioning system receiver), etc.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A system for performing classification comprising:
a hardware processor that:
implements a boosted classifier having a plurality of weak hypotheses that produce a classification, each of the plurality of weak hypotheses having at least one weight;
receives testing data;
receives at least one piece of training data subsequently to receiving the testing data;
calculates corrective terms for correcting a sum of weights of correctly classified training data and a sum of weights of incorrectly classified training data for at least one of the plurality of weak hypotheses based on a change in weights for the at least one weight of other of the plurality of weak hypotheses;
calculates the sum of weights of correctly classified training data and the sum of weights of incorrectly classified training data based on the corrective terms;
modifies the at least one weight of at least one of the plurality of weak hypotheses in response to the at least one piece of training data based on the sum of weights to produce modified weights; and
classifies the testing data based on the modified weights to produce a classification; and
an output device that indicates the classification of the testing data.

2. The system of claim 1, wherein the processor also determines, for each of at least two of the plurality of weak hypotheses, a product of the weight for the corresponding weak hypothesis and the classification for the corresponding weak hypothesis, and sums the products for the at least two of the plurality of weak hypotheses.

3. The system of claim 1, wherein the processor runs Adaboost prior to calculating the corrective terms.

4. The system of claim 1, wherein the training data has been manually classified.

5. The system of claim 1, wherein the testing data and the training data represent images.

6. The system of claim 1, wherein the testing data and the training data represent financial data.

7. The system of claim 1, wherein the testing data and the training data represent security data.

8. The system of claim 1, wherein the processor also determines whether to stop processing a piece of training data based on a margin associated with the piece of training data.

9. A method for performing classification comprising:
   implementing a boosted classifier having a plurality of weak hypotheses that produce a classification, each of the plurality of weak hypotheses having at least one weight, using a hardware processor;
   receiving testing data;
   receiving at least one piece of training data subsequently to receiving the testing data;
   calculating corrective terms for correcting a sum of weights of correctly classified training data and a sum of weights of incorrectly classified training data for at least one of the plurality of weak hypotheses based on a change in weights for the at least one weight of other of the plurality of weak hypotheses;
   calculating the sum of weights of correctly classified training data and the sum of weights of incorrectly classified training data based on the corrective terms;
   modifying the at least one weight of at least one of the plurality of weak hypotheses in response to the at least one piece of training data based on the sum of weights to produce modified weights;
   classifying the testing data based on the modified weights to produce a classification; and
   indicating the classification of the testing data.

10. The method of claim 9, further comprising determining, for each of at least two of the plurality of weak hypotheses, a product of the weight for the corresponding weak hypothesis and the classification for the corresponding weak hypothesis, and sums the products for the at least two of the plurality of weak hypotheses.

11. The method of claim 9, further comprising running Adaboost prior to calculating the corrective terms.

12. The method of claim 9, wherein the training data has been manually classified.

13. The method of claim 9, wherein the testing data and the training data represent images.

14. The method of claim 9, wherein the testing data and the training data represent financial data.

15. The method of claim 9, wherein the testing data and the training data represent security data.

16. The method of claim 9, further comprising determining whether to stop processing a piece of training data based on a margin associated with the piece of training data.

17. A non-transitory computer readable medium encoded with computer executable instructions that when executed by a processor cause the processor to perform a method for performing classification, the method comprising:
   implementing a boosted classifier having a plurality of weak hypotheses that produce a classification, each of the plurality of weak hypotheses having at least one weight;
   receiving testing data;
   receiving at least one piece of training data subsequently to receiving the testing data;
   calculating corrective terms for correcting a sum of weights of correctly classified training data and a sum of weights of incorrectly classified training data for at least one of the plurality of weak hypotheses based on a change in weights for the at least one weight of other of the plurality of weak hypotheses;
   calculating the sum of weights of correctly classified training data and the sum of weights of incorrectly classified training data based on the corrective terms;
   modifying the at least one weight of at least one of the plurality of weak hypotheses in response to the at least one piece of training data based on the sum of weights to produce modified weights;
   classifying the testing data based on the modified weights to produce a classification; and
   indicating the classification of the testing data.

18. The non-transitory computer readable medium of claim 17, wherein the method further comprises determining, for each of at least two of the plurality of weak hypotheses, a product of the weight for the corresponding weak hypothesis and the classification for the corresponding weak hypothesis, and sums the products for the at least two of the plurality of weak hypotheses.

19. The non-transitory computer readable medium of claim 17, wherein the method further comprises running Adaboost prior to calculating the corrective terms.

20. The non-transitory computer readable medium of claim 17, wherein the training data has been manually classified.

21. The non-transitory computer readable medium of claim 17, wherein the testing data and the training data represent images.

22. The non-transitory computer readable medium of claim 17, wherein the testing data and the training data represent financial data.

23. The non-transitory computer readable medium of claim 17, wherein the testing data and the training data represent security data.

24. The non-transitory computer readable medium of claim 17, wherein the method further comprises determining whether to stop processing a piece of training data based on a margin associated with the piece of training data.

* * * * *